(12) United States Patent

Seo

(10) Patent No.: US 7,948,924 B2
(45) Date of Patent: May 24, 2011

(54) APPARATUS FOR OPTIONALLY SUPPORTING TIME DIVISION DUPLEX AND FREQUENCY DIVISION DUPLEX IN A WIRELESS COMMUNICATION SYSTEM

(75) Inventor: Cheol-Soo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 12/031,948

(22) Filed: Feb. 15, 2008

(65) Prior Publication Data

US 2008/0198776 A1   Aug. 21, 2008

(30) Foreign Application Priority Data

Feb. 15, 2007   (KR) .................. 10-2007-0015729

(51) Int. Cl.
*H04J 4/00*   (2006.01)
(52) U.S. Cl. ........ 370/280; 370/281; 370/294; 370/295; 455/79; 455/73
(58) Field of Classification Search .................. 370/280, 370/281, 294, 295; 455/79, 73, 74, 552, 455/553
See application file for complete search history.

(56) References Cited

U.S. PATENT DOCUMENTS

| 5,715,525 | A | * | 2/1998 | Tarusawa et al. | 455/101 |
| 5,881,369 | A |  | 3/1999 | Dean et al. | |
| 5,913,153 | A | * | 6/1999 | Nakamoto et al. | 455/78 |
| 6,405,025 | B1 | * | 6/2002 | Keski-Mattinen | 455/266 |
| 6,788,253 | B1 | * | 9/2004 | Calin | 342/464 |
| 7,308,024 | B2 | * | 12/2007 | Mohan | 375/219 |
| 2002/0016183 | A1 | * | 2/2002 | Lehtinen | 455/553 |
| 2002/0090974 | A1 | * | 7/2002 | Hagn | 455/552 |

FOREIGN PATENT DOCUMENTS

| KR | 10-2004-0069569 A | 8/2004 |
| KR | 10-2005-0120715 A | 12/2005 |
| KR | 10-2006-0057431 A | 5/2006 |

* cited by examiner

*Primary Examiner* — Ricky Ngo
*Assistant Examiner* — Rasheed Gidado
(74) *Attorney, Agent, or Firm* — Jefferson IP Law, LLP

(57) ABSTRACT

A Radio Frequency (RF) front-end apparatus in a wireless communication system is provided. The apparatus includes a plurality of BandPass Filters (BPFs) for band-pass filtering a transmission signal or a reception signal, at least one circulator for dividing a signal transmission path and a signal reception path and at least one switch for controlling the signal transmission path and the signal reception path. The RF front-end apparatus provided by the present invention supports various frequency bands and optionally supports TDD and FDD in a wireless communication system.

18 Claims, 8 Drawing Sheets

APPARATUS FOR OPTIONALLY SUPPORTING TIME DIVISION DUPLEX AND FREQUENCY DIVISION DUPLEX IN A WIRELESS COMMUNICATION SYSTEM

PRIORITY

This application claims the benefit under 35 U.S.C. §119(a) of a Korean patent application filed in the Korean Intellectual Property Office on Feb. 15, 2007 and assigned Serial No. 2007-15729, the entire disclosure of which is hereby incorporated by reference.

BACKGROUND OF THE INVENTION

1. Field of the Invention

The present invention relates generally to a Radio Frequency (RF) front end of a Base Station (BS) in a wireless communication system. More particularly, the present invention relates to an RF front-end apparatus of a BS for optionally supporting Time Division Duplex (TDD) and Frequency Division Duplex (FDD) in a wireless communication system.

2. Description of the Related Art

Time Division Duplex (TDD) and Frequency Division Duplex (FDD) are schemes for distinguishing transmission and reception signals in a wireless communication system. In the TDD scheme, a single frequency is used for both transmission and reception but the transmission and reception are performed at different times. More specifically, the TDD scheme divides a time interval and performs transmission during a first period of the time interval and performs reception during a remaining time of the interval. In the FDD scheme, transmission and reception are performed at the same time, but the transmission and reception are performed on different frequency bands which are allocated to each of the transmission and reception signals.

FIGS. 1A and 1B are block diagrams illustrating a construction of a Base Station (BS) in a wireless communication system according to the conventional art.

FIG. 1A is a block diagram illustrating a construction of a BS employing the TDD scheme. The BS includes a baseband processor 110, an Intermediate Frequency (IF) processor 120 and a Radio Frequency (RF) processor 130. Referring to FIG. 1A, when the BS is in a transmission mode the baseband processor 110 codes, demodulates, converts an information bit stream into a baseband digital signal and provides the digital signal to the IF processor 120. The IF processor 120 converts the received baseband digital signal into an IF band analog signal and provides the analog signal to the RF processor 130. The RF processor 130 converts the IF band analog signal into an RF band signal and transmits the RF band signal through an antenna.

Construction of the RF processor 130 will now be described in detail. The RF processor 130 includes a Power Amplifier (PA) 131, a Low Noise Amplifier (LNA) 132 and a Time Division Duplexer (TDD) 134. The PA 131 amplifies a transmitted signal and the LNA 132 amplifies a received signal. The TDD 134 includes a switch 135 and a BandPass Filter (BPF) 136. The switch 135 connects the PA 131 with the BPF 136 during a transmission time and connects the LNA 132 with the BPF 136 during a reception time. The BPF 136 denies transmission of all frequency bands of an input signal except for a frequency band used for transmission and reception. Thus, the BS can perform transmission and reception at desired time intervals due to a switching operation of the switch 135.

FIG. 1B is a block diagram illustrating a construction of a BS employing the FDD scheme. In the FDD BS shown in FIG. 1B, a baseband processor 110 and an IF processor 120 are the same as those of the TDD BS shown in FIG. 1A and only a construction for duplex in an RF processor 140 is different. The RF processor 140 includes a PA 141, an LNA 142 and a Frequency Division Duplexer (FDD) 144. The PA 141 amplifies a transmitted signal and the LNA 142 amplifies a received signal. The FDD 144 includes a transmission BPF 145 and a reception BPF 146. In a transmission mode, the transmission BPF 145 denies transmission of all frequency bands of a signal input from the PA 141 except for a transmission band and transmits the result through an antenna. In a reception mode, the reception BPF 146 denies transmission of all frequency bands of a signal received through the antenna except for a reception band and provides the result to the LNA 142. In order to prevent a transmission mode signal from the PA 141 being provided to the LNA 142 and to prevent a reception mode signal from the antenna being provided to the PA 141, a circulator can also be positioned between the antenna and the BPFs 145 and 146. Thus, the BS can perform transmission and reception classified by a frequency band due to operation of the BPFs 145 and 146.

The decision of whether to employ the TDD or FDD scheme is made at the time a system is designed. Once the decision is made, a BS is configured having a fixed type according to the TDD or FDD scheme. It would be advantageous if there were a system capable of supporting both the TDD and FDD schemes. However, because the conventional TDD 134 and the FDD 144 are constructed differently from each other, as shown in FIGS. 1A and 1B, a change from one duplex scheme to another must be implemented in a manner such as adding a new type of duplexer which may include the removing of an existing duplexer.

In this case, a system manager must be able to separately manage the duplexer previously in use because the new duplexer is installed having different control parameters. Further, if a frequency band used for a communication system is different in every area in which a user desires to receive service, the degree of equipment utilization is degraded because the system manager must use a duplexer of a different band in every area in which service is to be provided. Furthermore, the degree of spectrum utilization and the chance of system utilization decrease because the system manager is limited to the system design for a diversity of frequency bands and duplex schemes.

SUMMARY OF THE INVENTION

An aspect of the present invention is to address at least the above-mentioned problems and/or disadvantages and to provide at least the advantages described below. Accordingly, one aspect of the present invention is to provide an RF front-end apparatus for supporting all of TDD and FDD in a wireless communication system.

Another aspect of the present invention is to provide an RF front-end apparatus for supporting various frequency bands in a wireless communication system.

The above aspects are addressed by providing an apparatus for optionally supporting TDD and FDD in a wireless communication system.

According to one aspect of the present invention, a Radio Frequency (RF) front-end apparatus in a wireless communication system is provided. The apparatus includes a plurality of BandPass Filters (BPFs) for band-pass filtering signal, at least one circulator for isolating a signal transmission path and a signal reception path and at least one switch for controlling the signal transmission path and the signal reception path.

According to another aspect of the present invention, an RF front-end apparatus in a wireless communication system is provided. The apparatus includes a plurality of BPFs for band-pass filtering a signal, at least one circulator for isolating a signal transmission path and a signal reception path, a plurality of switches for controlling the signal transmission path and the signal reception path and a plurality of connectors for installing antennas.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A description of a Radio Frequency (RF) front-end apparatus for supporting both Time Division Duplex (TDD) and Frequency Division Duplex (FDD) according to an exemplary embodiment of the present invention is made below.

A basic construction of an RF front-end of a Base Station (BS) proposed in an exemplary embodiment of the present invention is described in detail below with reference to the accompanying drawings.

Figure 1A:
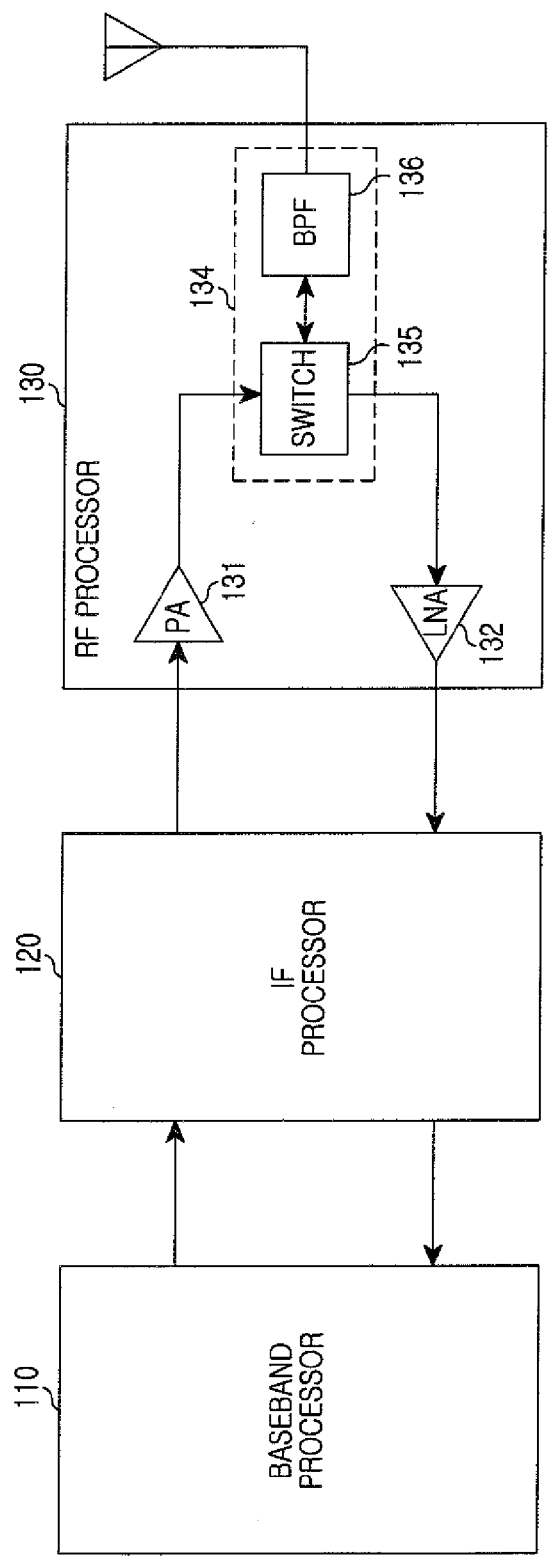
FIGS. 1A and 1B are block diagrams illustrating a construction of a BS in a wireless communication system according to the conventional art.
Figure 1B:
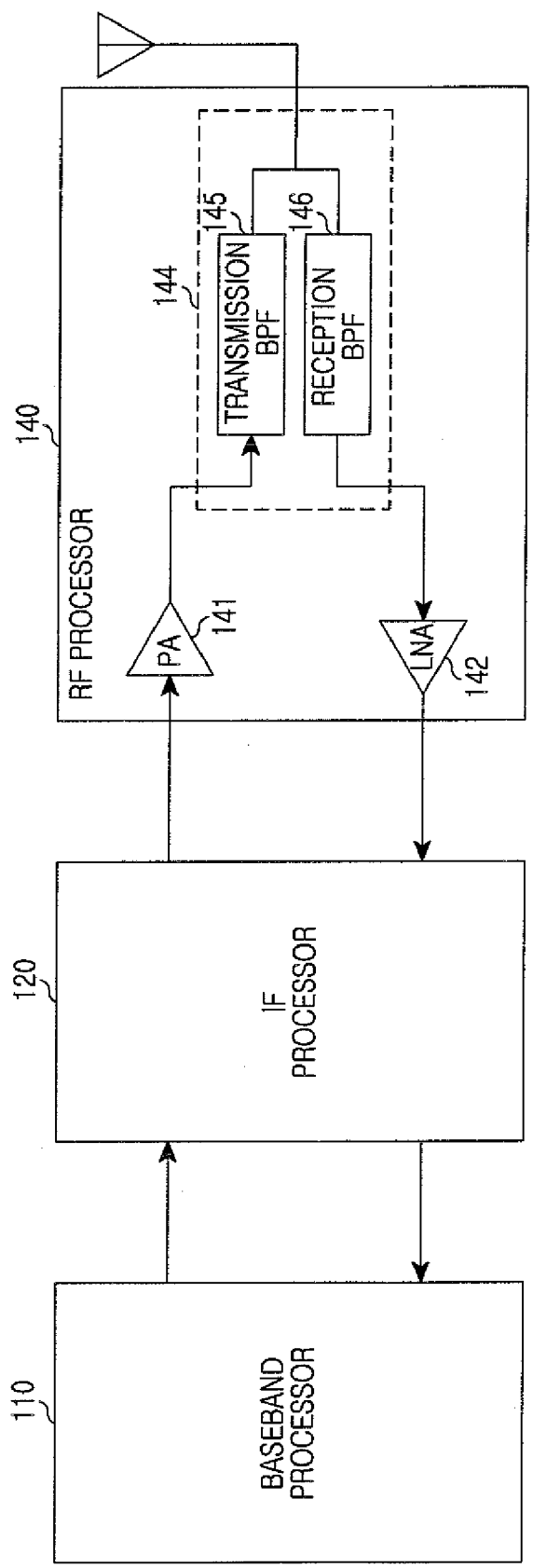
Figure 2:
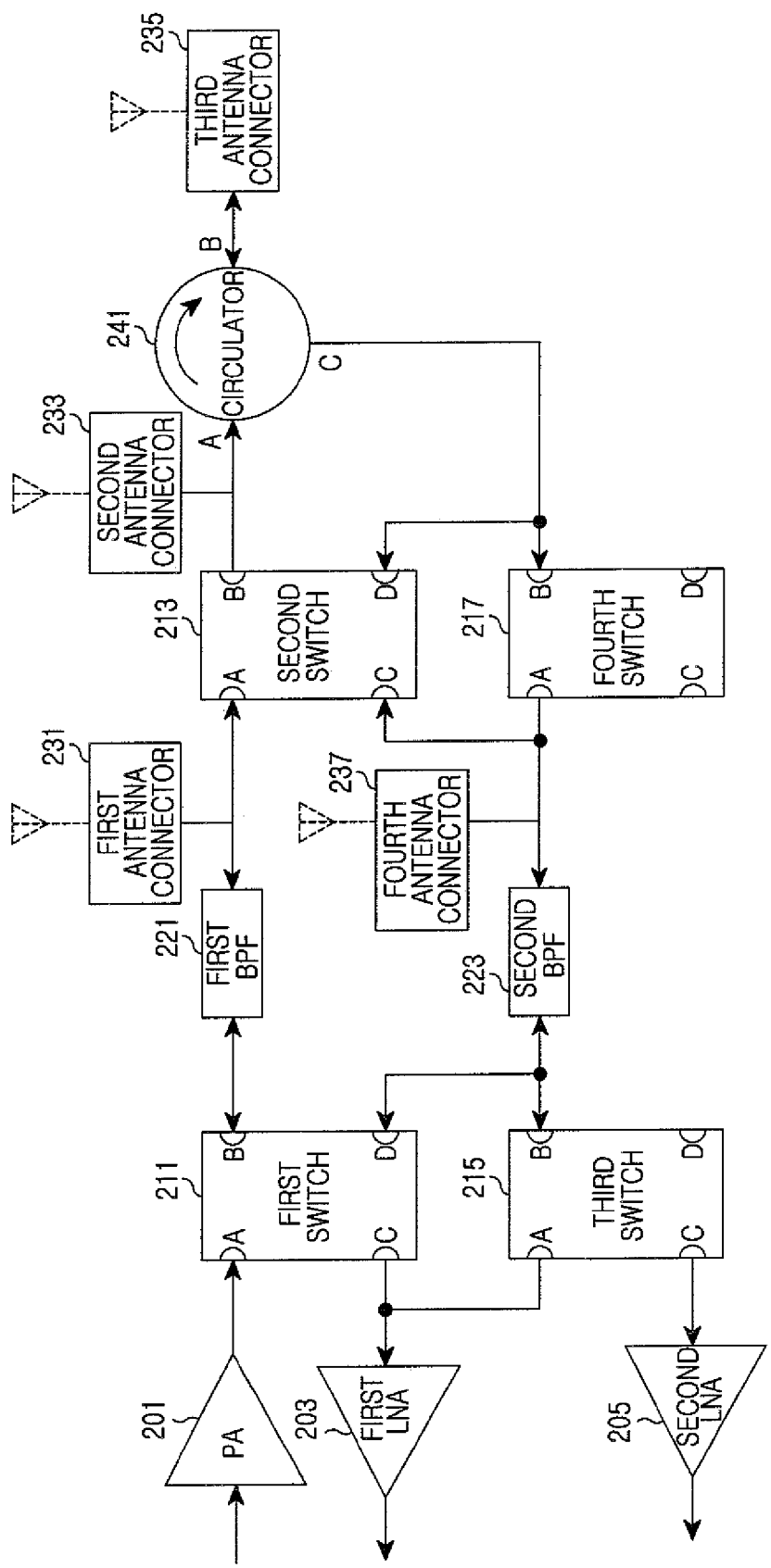
FIG. 2 is a block diagram illustrating a construction of a BS RF front end in a wireless communication system according to an exemplary embodiment of the present invention.

FIG. 2 is a block diagram illustrating a construction of a BS RF front end in a wireless communication system according to an exemplary embodiment of the present invention.

As shown in FIG. 2, the RF front end includes a Power Amplifier (PA) 201, a first Low Noise Amplifier (LNA) 203, a second LNA 205, a first switch 211, a second switch 213, a third switch 215, a fourth switch 217, a first Band Pass Filter (BPF) 221, a second BPF 223, a first antenna connector 231, a second antenna connector 233, a third antenna connector 235, a fourth antenna connector 237 and a circulator 241.

The switches 211, 213, 215, and 217 each have four terminals and all the terminals can be used as either input or output terminals. When one terminal is an input terminal, any or all of remaining three terminals is freely used as an output terminal and the input and output assignments may be made according to electronic control. That is, the switches 211, 213, 215, and 217 each operate like a 3 pole switch based on all terminals. A switch with the above characteristic is defined as an "omni-direction 3 pole switch" below. Furthermore, as will be explained and discussed in detail below, exemplary embodiments of the present invention provide an RF front end which may be used in several modes. Herein, a mode refers to a transmission/reception scheme, for example a Time Division Duplex mode, a Frequency Division Duplex mode and the like. Accordingly, in the following description of exemplary components, reference may be made to a mode or modes in which the component operates.

The PA 201 amplifies a transmission signal and is used in all modes. The first LNA 203 and the second LNA 205 amplify a reception signal and are used selectively according to a mode.

The switches 211, 213, 215, and 217 each control a signal flow path according to a mode. That is, the switches 211, 213, 215, and 217 each change input and output terminals under electronic control according to a mode. The switches 211, 213, 215 and 217 may each comprise an omni-directional 3 pole switch.

A connection relationship of each of the switches 211, 213, 215, and 217 is described below. The first switch 211 has a terminal A connecting with an output terminal of the PA 201, has a terminal B connecting with the first BPF 221, has a terminal C connecting with an input terminal of the first LNA 203 and a terminal A of the third switch 215 and has a terminal D connecting with the second BPF 223 and a terminal B of the third switch 215.

The second switch 213 has a terminal A connecting with the first BPF 221 and the first antenna connector 231, has a terminal B connecting with a terminal A of the circulator 241 and the second antenna connector 233, has a terminal C connecting with the second BPF 223, the fourth antenna connector 237 and a terminal A of the fourth switch 217, and has a terminal D connecting with a terminal C of the circulator 241 and a terminal B of the fourth switch 217.

The third switch 215 has a terminal A connecting with the input terminal of the first LNA 203 and the terminal C of the first switch 211, has a terminal B connecting with the second BPF 223 and the terminal D of the first switch 211, and has a terminal C connecting with an input terminal of the second LNA 205.

The fourth switch 217 has a terminal A connecting with the second BPF 223, the fourth antenna connector 237 and the terminal C of the second switch 213 and has a terminal B connecting with the terminal C of the circulator 241 and the terminal D of the second switch 213.

The first BPF 221 and the second BPF 223 each respectively cut off the frequency bands in a received signal except for their own pass frequency band. In an exemplary implementation, the pass frequency band of the first BPF 221 and the second BPF 223 are different from each other.

The antenna connectors 231, 233, 235, and 237 are each antenna ports for positioning antennas according to a mode and are used selectively according to a mode. As will be explained in more detail below, the antenna connectors may be variously used for different modes. For example, the first antenna connector 231 and the fourth antenna connector 237 may be used in a single Frequency-Time Division Duplex (FTDD) mode. The second antenna connector 233 may be used in a frequency selective TDD mode. The third antenna connector 235 may be used in an FDD mode.

The circulator 241 has three input/output terminals. The circulator 241 may receive a signal at any of its terminals and output the signal at a terminal corresponding to the input terminal. For examples, the circulator 241 may receive a signal at the terminal A and output the signal at a terminal B, may receive a signal at the terminal B and output the signal at the terminal C, and may receives a signal at the terminal C and output the signal at the terminal A. The circulator 241 divides a signal transmission path and a signal reception path and is mainly used in the FDD mode.

Exemplary embodiments of the present invention that provide for optionally supporting TDD or FDD using the RF front-end type are described below.

Table 1 shows a mode-based control state of the RF front end according to an exemplary embodiment of the present invention.

TABLE 1

| Mode | Path | PA | LNA | SW1 | SW3 | BPF | SW2 | SW4 | Cir. |
|---|---|---|---|---|---|---|---|---|---|
| TDD1 | Tx. | O | — | A-B | — | BPF1 | — | — | — |
|  | Rx. | — | LNA1 | B-C | — | BPF1 | — | — | — |
| TDD2 | Tx. | O | — | A-D | — | BPF2 | — | — | — |
|  | Rx. | — | LNA1 | D-C | — | BPF2 | — | — | — |
| TDD3-1 | Tx. | O | — | A-B | — | BPF1 | A-B | — | — |
|  | Rx. | — | LNA1 | B-C | — | BPF1 | B-A | — | — |
| TDD3-2 | Tx. | O | — | A-D | — | BPF2 | C-B | — | — |
|  | Rx. | — | LNA1 | D-C | — | BPF2 | B-C | — | — |
| FDD | Tx. | O | — | A-B | — | BPF1 | A-B | — | O |
|  | Rx. | — | LNA2 | — | B-C | BPF2 | — | B-A | O |
| TDD4 | Tx. | O | — | A-B | — | BPF1 | A-B | — | O |
|  | Rx. | — | LNA2 | B-C | A-C | BPF1 | D-A | — | O |

In Table 1, 'X-Y' is an expression of a control state of a switch. This means that a switch receives an input signal at a terminal X and outputs the signal to a terminal Y. For example, in TDD1 mode during signal transmission (Tx), first switch 211 (SW1) corresponds to a control state expression of A-B which indicates that the first switch 211 receives an input signal at terminal A and outputs the signal to terminal B. The exemplary modes shown in Table 1 each are described below in detail with reference to FIGS. 3A to 3E.

Figure 3A:
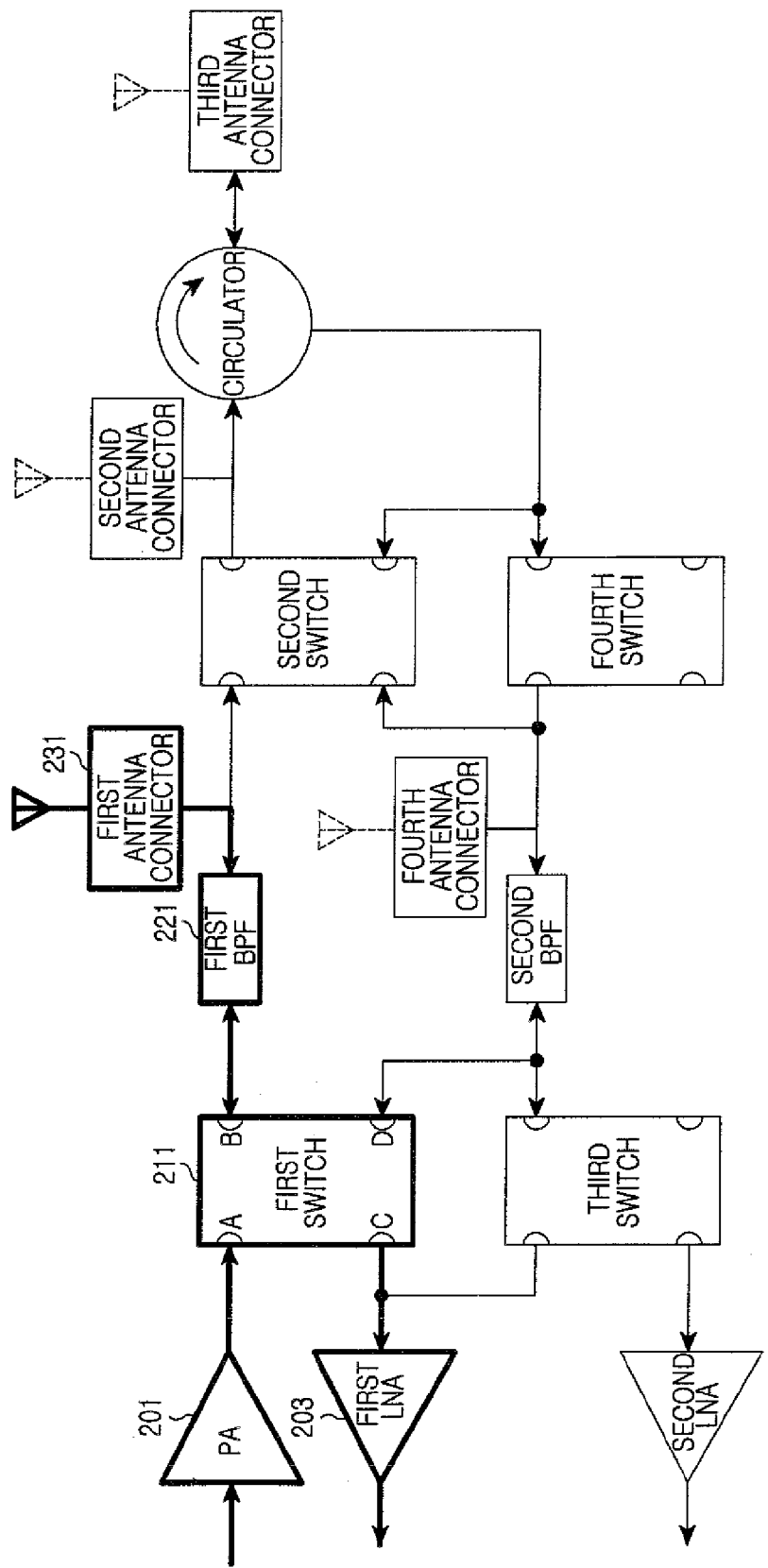
FIG. 3A is a diagram illustrating a transmission/reception path of a BS RF front end in a wireless communication system according to a first exemplary embodiment of the present invention.

FIG. 3A is a diagram illustrating a transmission/reception path of a BS RF front end in a wireless communication system according to a first exemplary embodiment of the present invention. FIG. 3A shows a construction used in a 'TDD1' mode shown in Table 1.

As shown in FIG. 3A, the 'TDD1' mode is a mode using a PA 201, a first LNA 203, a first switch 211, a first BPF 221 and a first antenna connector 231.

In the 'TDD1' mode, a TDD communication is performed with a pass frequency band of the first BPF 221 using the construction of FIG. 3A. That is, a transmission signal and a reception signal use the first antenna connector 231 directly connecting with the first BPF 221, thus passing through the first BPF 221. As illustrated in Table 1, the first switch 211 operates in 'A-B' during a transmission time and in 'B-C' during a reception time. The 'TDD1' mode supports only a communication through the pass frequency band of the first BPF 221.

Figure 3B:
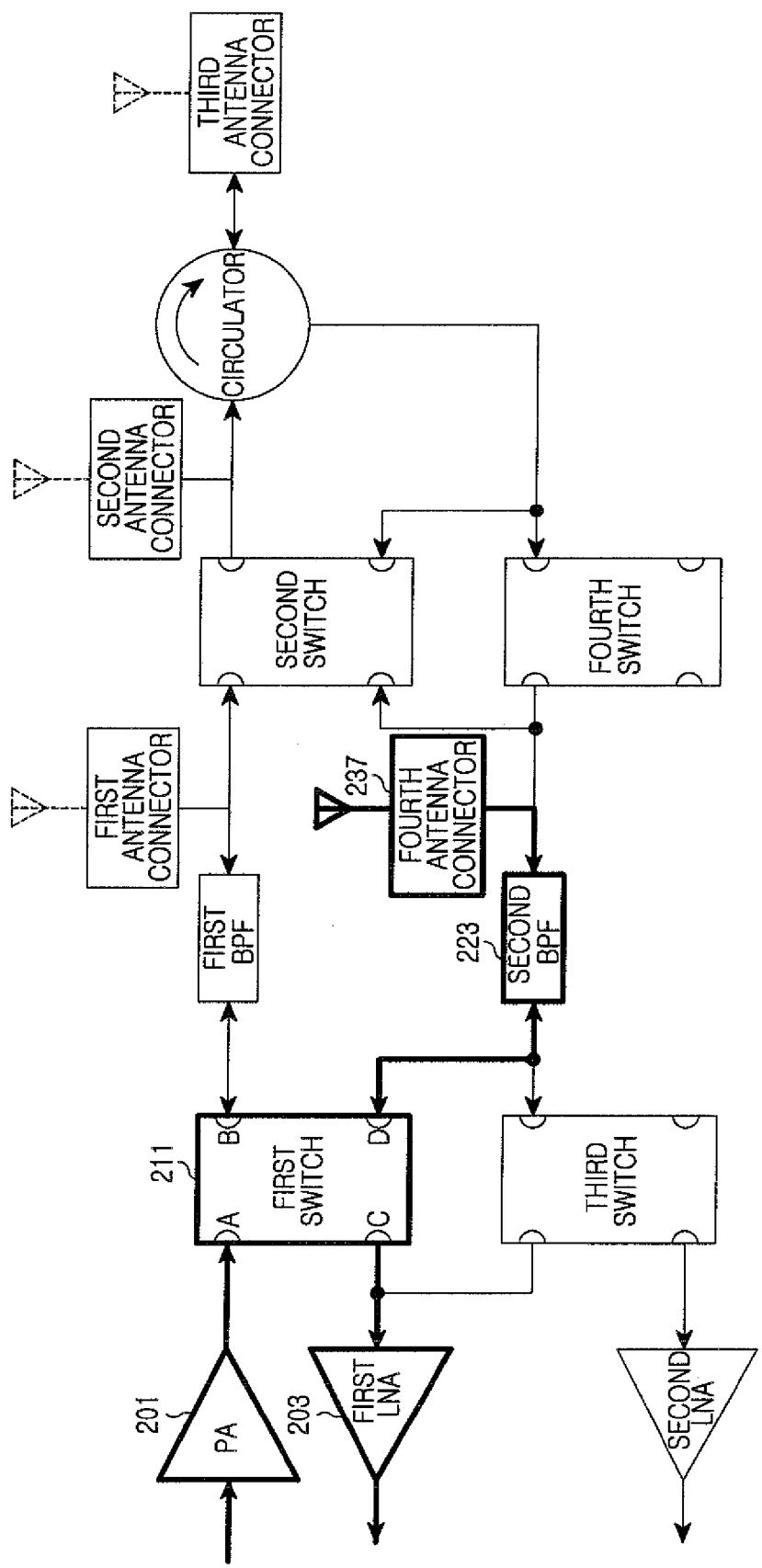
FIG. 3B is a diagram illustrating a transmission/reception path of a BS RF front end in a wireless communication system according to a second exemplary embodiment of the present invention.

FIG. 3B is a diagram illustrating a transmission/reception path of a BS RF front end in a wireless communication system according to a second exemplary embodiment of the present invention. FIG. 3B shows a construction used in a 'TDD2' mode shown in Table 1.

As shown in FIG. 3B, the 'TDD2' mode is a mode using a PA 201, a first LNA 203, a first switch 211, a second BPF 223 and a fourth antenna connector 237.

In the 'TDD2' mode, a TDD communication is performed with a pass frequency band of the second BPF 223 using the construction of FIG. 3B. That is, a transmission signal and a reception signal use the fourth antenna connector 237 directly connecting with the second BPF 223, thus passing through the second BPF 223. As illustrated in Table 1, the first switch 211 operates in 'A-D' during a transmission time and in 'D-C' during a reception time. The 'TDD2' mode supports only a communication through the pass frequency band of the second BPF 223.

Figure 3C:
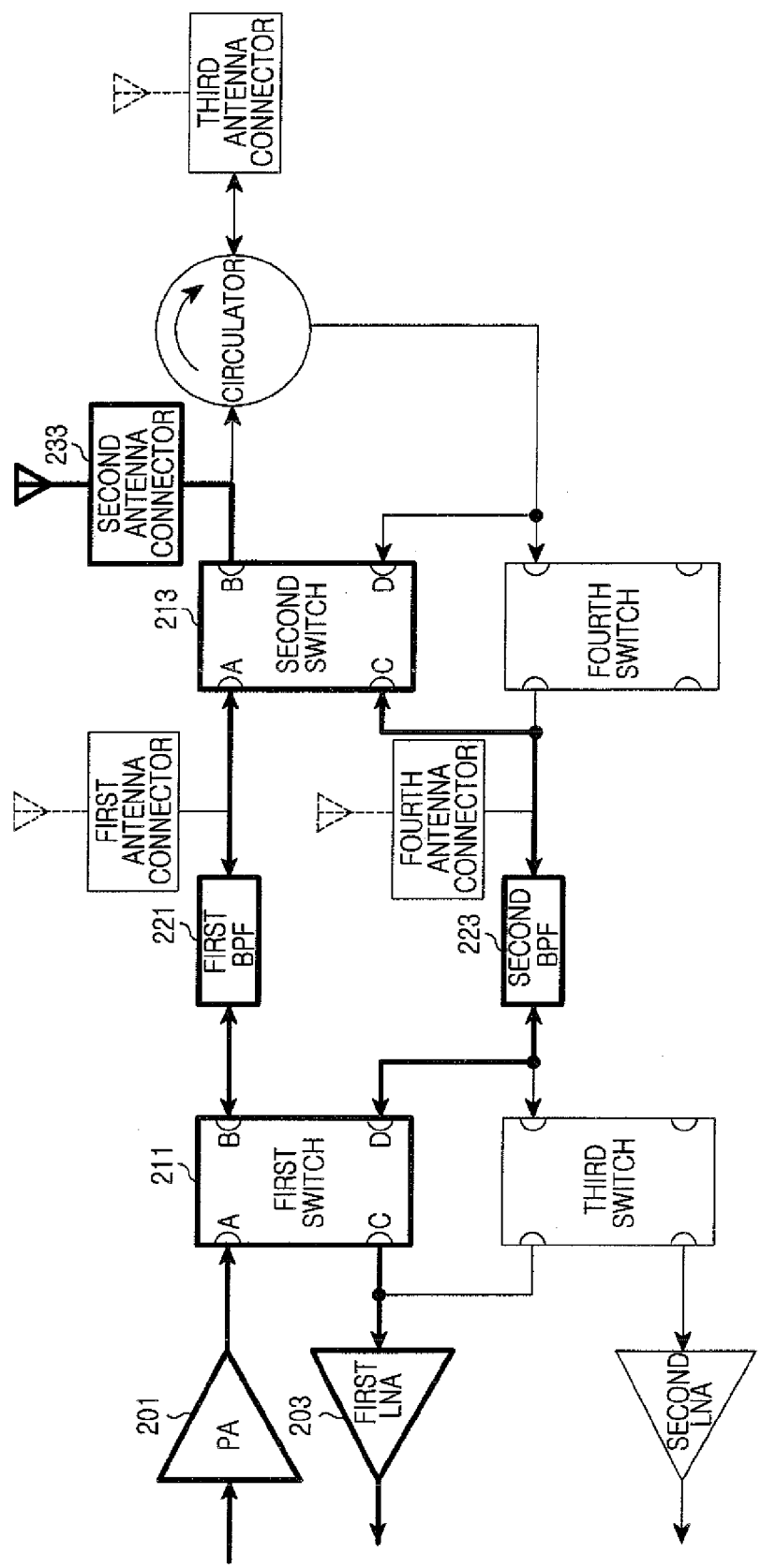
FIG. 3C is a diagram illustrating a transmission/reception path of a BS RF front end in a wireless communication system according to a third exemplary embodiment of the present invention.

FIG. 3C is a diagram illustrating a transmission/reception path of a BS RF front end in a wireless communication system according to a third exemplary embodiment of the present invention. FIG. 3C shows a construction used in a 'TDD3-1' mode and a 'TDD3-2' mode shown in Table 1.

As shown in FIG. 3C, the 'TDD3' mode, which includes the 'TDD3-1' mode and the 'TDD3-2' mode, is a mode using a PA 201, a first LNA 203, a first switch 211, a second switch 223, a first BPF 221, a second BPF 223, and a second antenna connector 233.

In the 'TDD3' mode, a plurality of frequency bands are selectively used and a TDD communication is performed, using the construction of FIG. 3C. That is, as illustrated in FIG. 3C and with reference Table 1, the 'TDD3' mode can selectively use either a pass frequency band of the first BPF 221 for 'TDD3-1' mode or a pass frequency band of the second BPF 223 for 'TDD3-2' mode. The frequency band is selected according to control states of the first switch 211 and the second switch 213.

First, if the pass frequency band of the first BPF 221 is used, the BS RF front end enters 'TDD3-1' mode wherein the first switch 211 operates in 'A-B' during a transmission time and in 'B-C' during a reception time and the second switch 223 operates in 'A-B' during a transmission time and in 'B-A' during a reception time. If the pass frequency band of the second BPF 223 is used, the BS RF front end enters 'TDD3-2' mode wherein the first switch 211 operates in 'A-D' during a transmission time and in 'D-C' during a reception time and the second switch 223 operates in 'C-B' during a transmission time and in 'B-C' during a reception time.

Figure 3D:
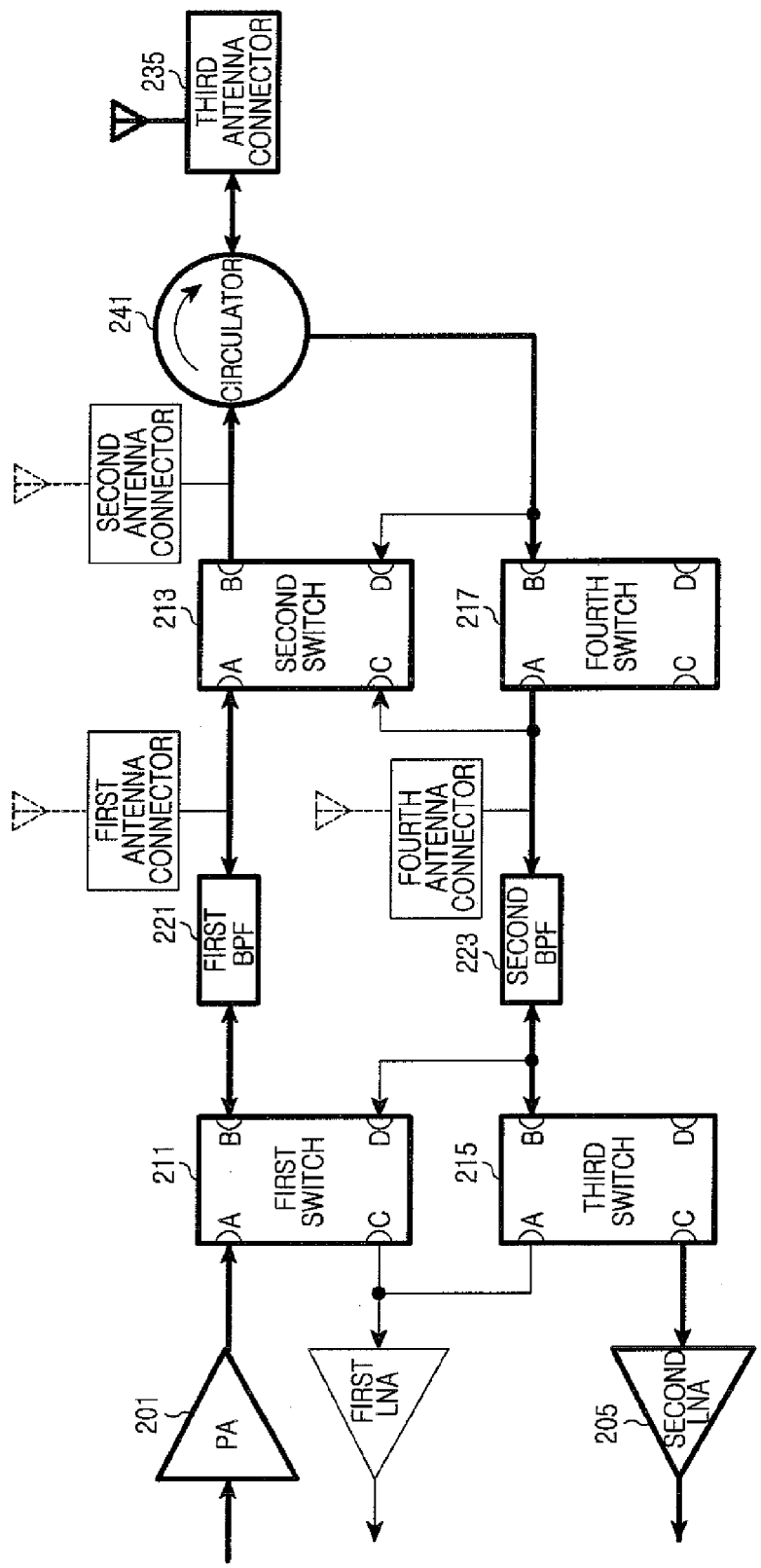
FIG. 3D is a diagram illustrating a transmission/reception path of a BS RF front end in a wireless communication system according to a fourth exemplary embodiment of the present invention.

FIG. 3D is a diagram illustrating a transmission/reception path of a BS RF front end in a wireless communication system according to a fourth exemplary embodiment of the present invention. FIG. 3D shows a construction used in an 'FDD' mode shown in Table 3.

As shown in FIG. 3D, the 'FDD' mode is a mode using a PA 201, a second LNA 205, a first switch 211, a second switch 223, a third switch 225, a fourth switch 227, a first BPF 221, a second BPF 223, a circulator 241, and a third antenna connector 235.

In the 'FDD' mode, an FDD communication is performed using the construction of FIG. 3D. In FIG. 3D, a pass frequency band of the first BPF 221 is a transmission frequency band and a pass frequency band of the second BPF 223 is a reception frequency band. The first switch 211, the second switch 213, the third switch 215, and the fourth switch 217 operate in 'A-B', 'A-B', 'B-C', and 'B-A', respectively.

Figure 3E:
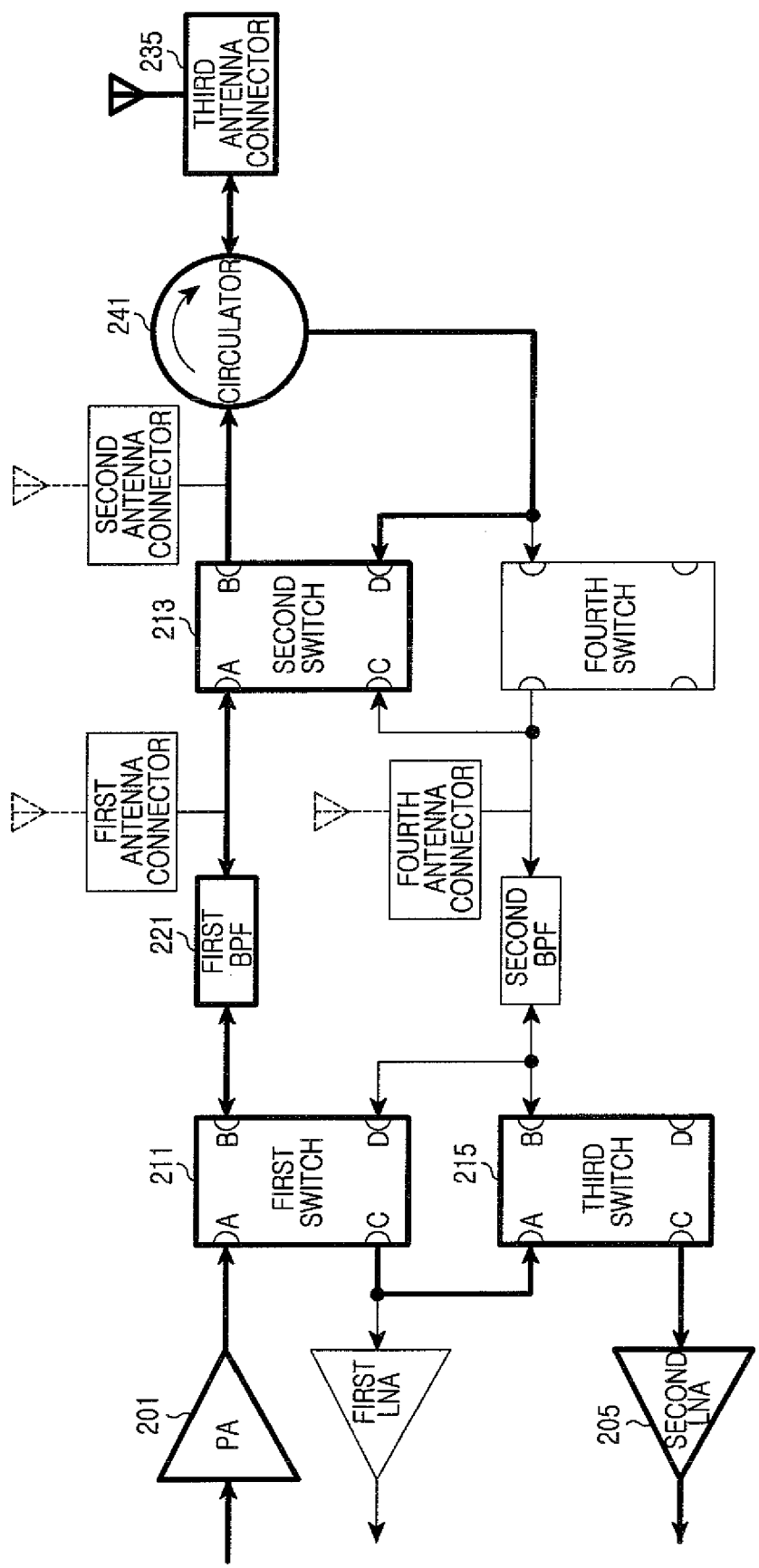
FIG. 3E is a diagram illustrating a transmission/reception path of a BS RF front end in a wireless communication system according to a fifth exemplary embodiment of the present invention.

FIG. 3E is a diagram illustrating a transmission/reception path of a BS RF front end in a wireless communication system according to a fifth exemplary embodiment of the present invention. FIG. 3E shows a construction used in a 'TDD4' mode shown in Table 1.

As shown in FIG. 3E, the 'TDD4' mode is a mode using a PA 201, a second LNA 205, a first switch 211, a second switch 213, a third switch 215, a first BPF 221, a circulator 241, and a third antenna connector 235.

In the 'TDD4' mode, a TDD communication is performed with a pass frequency band of the first BPF 221 using the construction of FIG. 3E. In the 'TDD4' mode, a duplex scheme and a use frequency band are identical with those of the 'TDD1' mode, but can be provided identical with those of the 'FDD' mode, the 'TDD3' mode, and the 'TDD2' mode according to a control state of each switch 211, 213, 215, or 217. That is, the construction using the third antenna connector 235 is an integration of the constructions of all the modes and can provide diverse paths other than the path shown in FIG. 3E.

In cases where the path of FIG. 3E is used, the first switch 211 operates in 'A-B' during a transmission time and in 'B-C' during a reception time. The second switch 213 operates in 'A-B' during a transmission time and in 'D-A' during a reception time. The third switch 215 operates in 'A-C' during a reception time.

The BS RF front end described in FIG. 2 includes two BPFs, four omni-direction 3 pole switches, four antenna connectors, and one circulator. It is to be understood that these are merely examples of constituent elements for clarity of description and convenience. That is, the BS RF front-end apparatus of the present invention may include more or fewer constituent elements, thereby expanding a supportable frequency band and a supportable mode number.

As described above, exemplary embodiments of the present invention configure a BS RF front end using a plurality of switches and a plurality of BPFs in a wireless communication system, thereby enabling a BS to support both TDD and FDD concurrently and to perform communication using a diversity of frequency bands.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Radio Frequency (RF) front-end apparatus in a wireless communication system, the apparatus comprising:
    a first BandPass Filter (BPF) for selectively passing a signal except having a first band;
    a second BPF for selectively passing a signal except having a second band;
    at least one circulator for isolating a signal transmission path and a signal reception path;
    a plurality of switches for controlling the signal transmission path and the signal reception path;
    a plurality of connectors for installing antennas;
    a transmission amplifier for amplifying a transmission signal; and
    a first reception amplifier and a second reception amplifier for amplifying a reception signal,
    wherein each of the plurality of switches has N number of terminals and operates as an N−1 pole switch at each terminal, wherein each of the N number of terminals function as at least one of an input terminal and an output terminal and the input and output functions of the terminals are assigned by electronic control,
    wherein the plurality of switches comprises a first switch having a first terminal connecting with an output terminal of the transmission amplifier, a second terminal connecting with the first BPF, a third terminal connecting with an input terminal of the first reception amplifier, and a fourth terminal connecting with the second BPF;
    a second switch having a first terminal connecting with the first BPF, a second terminal connecting with the circulator, a third terminal connecting with the second BPF, and a fourth terminal connecting with the circulator;
    a third switch having a first terminal connecting with an input terminal of the first reception amplifier and the third terminal of the first switch, a second terminal connecting with the second BPF, and a third terminal connecting with the input terminal of the second reception amplifier; and
    a fourth switch having a first terminal connecting with the second BPF and a second terminal connecting with the circulator.

2. The apparatus of claim 1, wherein the plurality of connectors comprise:
    a first connector connecting with the first BPF;
    a second connector connecting with the second terminal of the second switch;
    a third connector connecting with the circulator; and
    a fourth connector connecting with the second BPF.

3. The apparatus of claim 2, wherein the first switch operates in a Time Division Duplex (TDD) mode wherein the signal transmission path and the signal reception path comprise the same BPF and further wherein the first switch operates in a Frequency Division Duplex (FDD) mode wherein the signal transmission path and the signal reception path comprise a different BPF.

4. The apparatus of claim 2, comprising an antenna installed in the first connector, wherein the first switch inputs a signal at the first terminal and outputs the signal at the second terminal during a transmission time and inputs a signal at the second terminal and outputs the signal at the third terminal during a reception time.

5. The apparatus of claim 2, comprising an antenna installed in the fourth connector, wherein the first switch inputs a signal at the first terminal and outputs the signal at the fourth terminal during a transmission time and inputs a signal at the fourth terminal and outputs the signal at the third terminal during a reception time.

6. The apparatus of claim 2, comprising an antenna installed in the second connector, wherein
    the first switch inputs a signal at the first terminal and outputs the signal at the second terminal during a transmission time and inputs a signal at the second terminal and outputs the signal at the third terminal during a reception time, and the second switch inputs a signal at the first terminal and outputs the signal at the second terminal during a transmission time and inputs a signal at the second terminal and outputs the signal at the first terminal during a reception time.

7. The apparatus of claim 2, comprising an antenna installed in the second connector, wherein the first switch inputs a signal at the first terminal and outputs the signal at the fourth terminal during a transmission time and inputs a signal at the fourth terminal and outputs the signal at the third terminal during a reception time, and the second switch inputs a signal at the third terminal and outputs the signal at the second terminal during a transmission time and inputs a signal at the second terminal and outputs the signal at the third terminal during a reception time.

8. The apparatus of claim 2, comprising an antenna installed in the third connector, wherein the first switch inputs a signal at the first terminal and outputs the signal at the second terminal, the second switch inputs a signal at the first terminal and outputs the signal at the second terminal;

the third switch inputs a signal at the second terminal and outputs the signal at the third terminal; and the fourth switch inputs a signal at the second terminal and outputs the signal at the first terminal.

9. The apparatus of claim 2, comprising an antenna installed in the third connector, wherein the first switch inputs a signal at the first terminal and outputs the signal at the second terminal during a transmission time and inputs a signal at the second terminal and outputs the signal at the third terminal during a reception time, the second switch inputs a signal at the first terminal and outputs the signal at the second terminal during a transmission time and inputs a signal at the fourth terminal and outputs the signal at the first terminal during a reception time, and the third switch inputs a signal at the first terminal and outputs the signal at the third terminal during a reception time.

10. A method for an operation of a Radio Frequency (RF) front-end in a wireless communication system, wherein the RF front-end comprises a first BandPass Filter (BPF) for selectively passing a signal except having a first band, a second BPF for selectively passing a signal except having a second band, at least one circulator for isolating the signal transmission path and the signal reception path, a plurality of switches for controlling the signal transmission path and the signal reception path, a plurality of connectors for installing antennas, a transmission amplifier for amplifying a transmission signal, and, a first reception amplifier and a second reception amplifier for amplifying a reception signal, the method comprising:

controlling a signal transmission path and a signal reception path by determining input terminals and output terminals of the plurality of switches according to a selected connecter in which an antenna is installed, wherein each of the plurality of switches has N number of terminals and operates as an N–1 pole switch at each terminal, wherein each of the N number of terminals function as at least one of an input terminal and an output terminal and the input and output functions of the terminals are assigned by electronic control, wherein the plurality of switches comprises, a first switch having a first terminal connecting with an output terminal of the transmission amplifier, a second terminal connecting with the first BPF, a third terminal connecting with an input terminal of the first reception amplifier, and a fourth terminal connecting with the second BPF;

a second switch having a first terminal connecting with the first BPF, a second terminal connecting with the circulator, a third terminal connecting with the second BPF, and a fourth terminal connecting with the circulator;

a third switch having a first terminal connecting with an input terminal of the first reception amplifier and the third terminal of the first switch, a second terminal connecting with the second BPF, and a third terminal connecting with the input terminal of the second reception amplifier; and a fourth switch having a first terminal connecting with the second BPF and a second terminal connecting with the circulator.

11. The method of claim 10, wherein the plurality of connectors comprise:

a first connector connecting with the first BPF;

a second connector connecting with the second terminal of the second switch;

a third connector connecting with the circulator; and a fourth connector connecting with the second BPF.

12. The method of claim 11, wherein the controlling of the signal transmission path and the signal reception path comprises, in a Time Division Duplex (TDD) mode, controlling the signal transmission path and the signal reception path to comprise the same BPF; and in a Frequency Division Duplex (FDD) mode, controlling the signal transmission path and the signal reception path to comprise a different BPF.

13. The method of claim 11, wherein the controlling of the signal transmission path and the signal reception path comprises, when the antenna is installed in the first connector, controlling the first switch to input a signal at the first terminal and to output the signal at the second terminal during a transmission time, and to input a signal at the second terminal and to output the signal at the third terminal during a reception time.

14. The method of claim 11, wherein the controlling of the signal transmission path and the signal reception path comprises, when the antenna is installed in the fourth connector, controlling the first switch to input a signal at the first terminal and to output the signal at the fourth terminal during a transmission time, and to input a signal at the fourth terminal and to output the signal at the third terminal during a reception time.

15. The method of claim 11, wherein the controlling of the signal transmission path and the signal reception path comprises, when the antenna is installed in the second connector, controlling the first switch to input a signal at the first terminal and to output the signal at the second terminal during a transmission time, and to input a signal at the second terminal and to output the signal at the third terminal during a reception time; and controlling the second switch to input a signal at the first terminal and to output the signal at the second terminal during a transmission time, and to input a signal at the second terminal and to output the signal at the first terminal during a reception time.

16. The method of claim 11, wherein the controlling of the signal transmission path and the signal reception path comprises, when the antenna is installed in the second connector, controlling the first switch to input a signal at the first terminal and to output the signal at the fourth terminal during a transmission time, and to input a signal at the fourth terminal and to output the signal at the third terminal during a reception time; and controlling the second switch to input a signal at the third terminal and to output the signal at the second terminal during a transmission time, and to input a signal at the second terminal and to output the signal at the third terminal during a reception time.

17. The method of claim 11, wherein the controlling of the signal transmission path and the signal reception path comprises, when the antenna is installed in the third connector, controlling the first switch to input a signal at the first terminal and to output the signal at the second terminal;

controlling the second switch to input a signal at the first terminal and to output the signal at the second terminal;

controlling the third switch to input a signal at the second terminal and to output the signal at the third terminal; and controlling the fourth switch to input a signal at the second terminal and to output the signal at the first terminal.

18. The method of claim 11, wherein the controlling of the signal transmission path and the signal reception path comprises, when the antenna is installed in the third connector, controlling the first switch to input a signal at the first terminal and to output the signal at the second terminal during a transmission time and to input a signal at the second terminal and to output the signal at the third terminal during a reception time;

controlling the second switch to input a signal at the first terminal and to output the signal at the second terminal during a transmission time and to input a signal at the fourth terminal and to output the signal at the first terminal during a reception time; and controlling the third switch to input a signal at the first terminal and to output the signal at the third terminal during a reception time.

* * * * *